(12) United States Patent
Sawada

(10) Patent No.: US 8,268,416 B2
(45) Date of Patent: Sep. 18, 2012

(54) THERMAL TRANSFER SHEET

(75) Inventor: Masakazu Sawada, Kanagawa (JP)

(73) Assignee: Sony Corporation, Tokyo (JP)

( * ) Notice: Subject to any disclaimer, the term of this patent is extended or adjusted under 35 U.S.C. 154(b) by 282 days.

(21) Appl. No.: 12/797,095

(22) Filed: Jun. 9, 2010

(65) Prior Publication Data

US 2010/0330307 A1    Dec. 30, 2010

(30) Foreign Application Priority Data

Jun. 29, 2009  (JP) ................. 2009-153621

(51) Int. Cl.
*A47G 19/22* (2006.01)
(52) U.S. Cl. .......... 428/32.64; 428/195.1; 428/206; 428/327; 428/913; 428/914
(58) Field of Classification Search ........... 428/195.1, 428/32.64, 206, 327, 913, 914
See application file for complete search history.

(56) References Cited

U.S. PATENT DOCUMENTS 6,710,016 B2 * 3/2004 Suzuki et al. ............... 503/227

FOREIGN PATENT DOCUMENTS

| JP | 08-244369 | | 9/1996 |
| JP | 2001-080222 | A1 * | 3/2001 |
| JP | 2001-334760 | | 12/2001 |

* cited by examiner

*Primary Examiner* — Betelhem Shewareged
(74) *Attorney, Agent, or Firm* — SNR Denton US LLP

(57) ABSTRACT

A thermal transfer sheet includes a base material sheet, a thermal transfer dye layer, which is disposed on one surface of the base material sheet and which contains a dye, and a heat-resistant lubricating layer disposed on the other surface of the base material sheet, wherein the heat-resistant lubricating layer is formed from a binder, in which a specific amount of at least one of a polyvinyl acetal having a softening point of 262° C. or higher and a glass transition temperature of 106° C. or higher and cellulose acetate propionate and a specific amount of polyamide imide silicone are mixed.

4 Claims, 4 Drawing Sheets

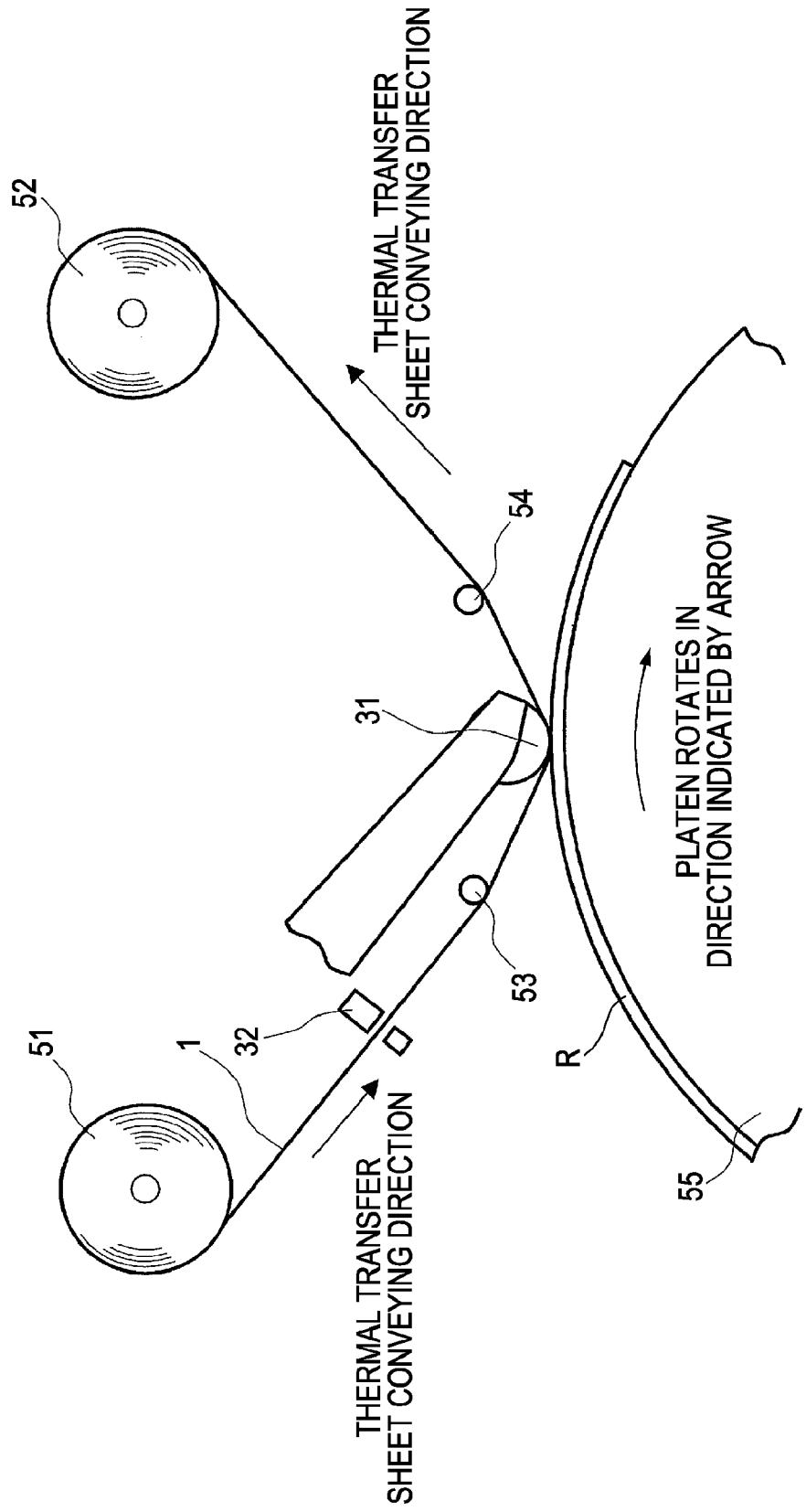

THERMAL TRANSFER SHEET

BACKGROUND OF THE INVENTION

1. Field of the Invention

The present invention relates to a thermal transfer sheet.

2. Description of the Related Art

A thermal transfer system by using a sublimation dye transfers a large number of color dots to a transfer receiver through a very short time heating so as to reproduce a full color image based on the color dots of a plurality of colors.

In this thermal transfer system, a so-called sublimation thermal transfer sheet, in which a dye layer composed of a sublimation dye and a binder is disposed on one surface of a base material sheet, e.g., a polyester film, is used as a thermal transfer sheet.

In the thermal transfer system, a thermal transfer sheet is heated from the back with a thermal head in accordance with image information so as to transfer a dye contained in the dye layer to a transfer receiver (photographic paper) and, thereby, form an image.

At this time, regarding the thermal transfer sheet, it is desired that a surface on the side coming into contact with the thermal head stably exhibits low friction over low density image printing to high density image printing. In general, the thermal transfer sheet is provided with a heat-resistant lubricating layer on the surface opposite to the surface, on which the dye layer is disposed, in order to prevent fusion with the thermal head and give smooth running smoothness.

As for the heat-resistant lubricating layer, a method, in which a thermosetting resin layer is formed so as to give heat resistance to a base material film, is used frequently. The abrasion resistance and the heat resistance are given to the thermal transfer sheet by this method. Although a good heat-resistant lubricating layer is obtained by using this method, it is difficult to give a slip property by merely a binder, and it is necessary to conduct heat curing. Consequently, the process becomes complicated and, as a result, a large production time is taken.

As for methods for solving such problems, a method, in which a polyamide imide silicone is used (refer to Japanese Unexamined Patent Application Publication No. 08-244369, for example), and a method, in which a mixture of a polyamide imide and a polyamide imide silicone is used as a binder (refer to Japanese Unexamined Patent Application Publication No. 2001-334760, for example), have been proposed.

In the case where the above-described binder is used, the transition temperatures Tg of the polyamide imide and the polyamide imide silicone are 200° C. or higher and, therefore, the heat resistance is given to the thermal transfer sheet. Furthermore, the slip property is given by an action of a silicone unit of the polyamide imide silicone and, thereby, a good heat-resistant lubricating layer is obtained without conducting heat curing.

However, in the case where merely the above-described polyamide imide and polyamide imide silicone are used as the binder, a polyimide raw material is used and, thereby, the cost becomes high. Moreover, the polyamide imide and the polyamide imide silicone have poor adhesion to a base material and, therefore, powder falling may occurs, so that the coating film stability is insufficient.

In addition, the coating film is whitened easily in drying and, therefore, it is necessary to pay attention to the drying condition.

Furthermore, a lubricant or a filler may be added to the heat-resistant lubricating layer when the slip property is adjusted and the thermal head polishing property is given. In the case where they are kept dispersing, there is a disadvantage in using merely the polyamide imide having no adsorption group nor active site, and coagulation may occur easily because of insufficient dispersibility.

SUMMARY OF THE INVENTION

The present inventor has recognized that in the case where merely the above-described polyamide imide and polyamide imide silicone are used as a binder, a polyimide raw material is used so as to cause a high cost, and since the polyamide imide and polyamide imide silicone have poor adhesion to a base material, powder falling may occurs, so as to cause insufficient coating film stability.

It is desirable to provide an inexpensive thermal transfer sheet having excellent lubricity and exhibiting excellent preservation stability without exerting no influence on a dye layer.

A thermal transfer sheet according to an embodiment of the present invention includes a base material sheet, a thermal transfer dye layer, which is disposed on one surface of the above-described base material sheet and which contains a dye, and a heat-resistant lubricating layer disposed on the other surface of the above-described base material sheet, wherein the above-described heat-resistant lubricating layer is formed from a binder, in which a specific amount of at least one of a polyvinyl acetal having a softening point of 262° C. or higher and a glass transition temperature of 106° C. or higher and a cellulose acetate propionate and a specific amount of polyamide imide silicone are mixed.

Regarding the thermal transfer sheet according to an embodiment of the present invention, the polyvinyl acetal having a softening point of 262° C. or higher is used and, therefore, a low friction coefficient is obtained at high temperatures.

On the other hand, if the softening point of the polyvinyl acetal is lower than 262° C., it becomes difficult to obtain a low friction coefficient at high temperatures.

Furthermore, the polyvinyl acetal having a glass transition temperature Tg of 106° C. or higher is used and, therefore, in the case where preservation is conducted in a high-temperature high-humidity environment while being in contact with the dye layer, the heat-resistant lubricating layer is not bonded to the dye layer, nor occurs dye transfer.

On the other hand, if the glass transition temperature Tg of the polyvinyl acetal is lower than 106° C., for example, 90° C., in the case where preservation is conducted in a high-temperature high-humidity environment while being in contact with the dye layer, the heat-resistant lubricating layer is bonded to the dye layer easily, and dye transfer occurs easily.

Moreover, a cellulose acetate propionate is also used as the binder favorably. The cellulose acetate propionate is not specifically limited.

The above-described two types of binders may be mixed with the polyamide imide silicone, alone or in a mixed state.

In addition, since the binder is formed by mixing a specific amount of at least one of the polyvinyl acetal and the cellulose acetate propionate under the above-described conditions and a specific amount of the polyamide imide silicone, the compatibility becomes satisfactory and sufficient lubricity and film strength are obtained.

The thermal transfer sheet according to an embodiment of the present invention includes the above-described binder and, therefore, an aging step is omitted in coating, so that an inexpensive thermal transfer sheet results. Furthermore, the binder is a mixture of a specific amount of at least one of the polyvinyl acetal and the cellulose acetate propionate and a specific amount of the polyamide imide silicone and, therefore, sufficient lubricity and film strength are obtained.

BRIEF DESCRIPTION OF THE DRAWINGS

FIG. 7 is a schematic configuration diagram showing a key portion of an image printing apparatus by using a thermal transfer sheet according to an embodiment of the present invention.

DESCRIPTION OF THE PREFERRED EMBODIMENTS

Embodiments for executing the present invention (hereafter referred to as embodiments) will be described below.

Embodiments

Configuration Example of Thermal Transfer Sheet

A configuration example of a thermal transfer sheet according to an embodiment of the present invention will be described with reference to a schematic configuration sectional view shown in FIG. 1.

Figure 1:
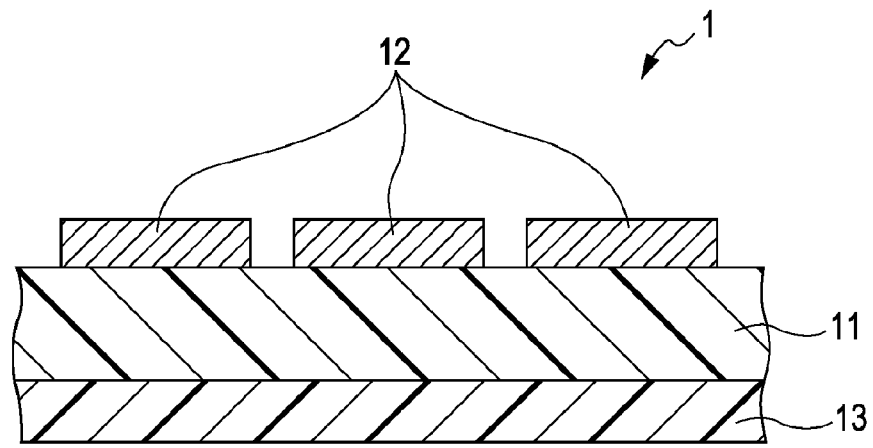
FIG. 1 is a schematic sectional view showing a configuration example of a thermal transfer sheet.

As shown in FIG. 1, in a thermal transfer sheet 1 according to an embodiment of the present invention, thermal transfer dye layers 12 are disposed on a base material sheet 11, and a heat-resistant lubricating layer 13 is disposed on a surface opposite thereto.

As for the above-described base material sheet 11, for example, polyester films, polystyrene films, polypropylene films, polysulfone films, polycarbonate films, polyimide films, and aramid films are used. The thickness of this base material sheet 11 is determined at will. For example, the thickness is 1 to 30 µm, and preferably 2 to 10 µm.

The thermal transfer dye layers 12 are disposed on the surface, which is on the side facing the photographic paper, of the above-described base material sheet 11. In the case of monochrome, the thermal transfer dye layer 12 is disposed as a continuous layer on all over the base material sheet 11. In order to respond to a full color image, in general, dye layers of individual colors of yellow, magenta, cyan, and the like (for example, a yellow dye layer, a magenta dye layer, a cyan dye layer, and the like) are disposed separately and sequentially.

Figure 2:
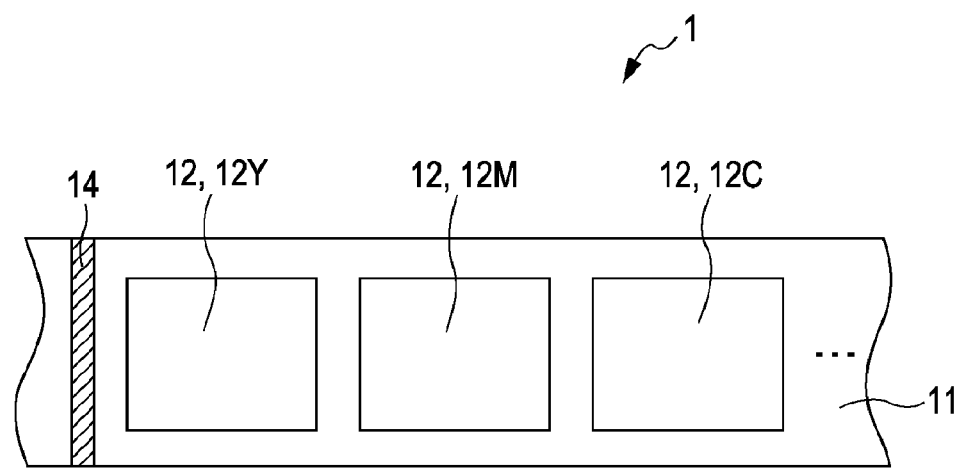
FIG. 2 is a schematic plan view showing a configuration example of a thermal transfer sheet.

As indicated by the schematic plan view showing a configuration example of a thermal transfer sheet shown in FIG. 2, a detection mark 14 for detecting the position is disposed on the above-described base material sheet 11 of the above-described thermal transfer sheet 1. For example, the above-described detection mark 14, the thermal transfer dye layer 12 (yellow dye layer 12Y), the thermal transfer dye layer 12 (magenta dye layer 12M), and the thermal transfer dye layer 12 (cyan dye layer 12C) are disposed on the base material sheet 11 sequentially and repeatedly, so that the above-described thermal transfer sheet 1 is formed.

Here, the order of disposition of yellow, magenta, and cyan is not necessarily this order. Furthermore, four colors of yellow, magenta, cyan, and black may be repeated. Alternatively, colors other than yellow, magenta, and cyan may be used, so as to employ four or more colors.

Figure 3:
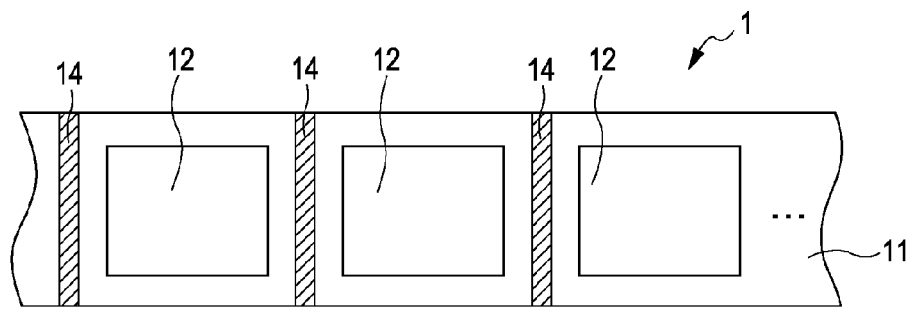
FIG. 3 is a schematic plan view showing an example of a thermal transfer sheet provided with detection marks between individual dye layers.

In addition, as indicated by the schematic plan view showing an example of a thermal transfer sheet shown in FIG. 3, detection marks 14 may be disposed on the base material sheet 11 between the individual thermal transfer dye layers 12 in the above-described thermal transfer sheet 1.

Figure 4:
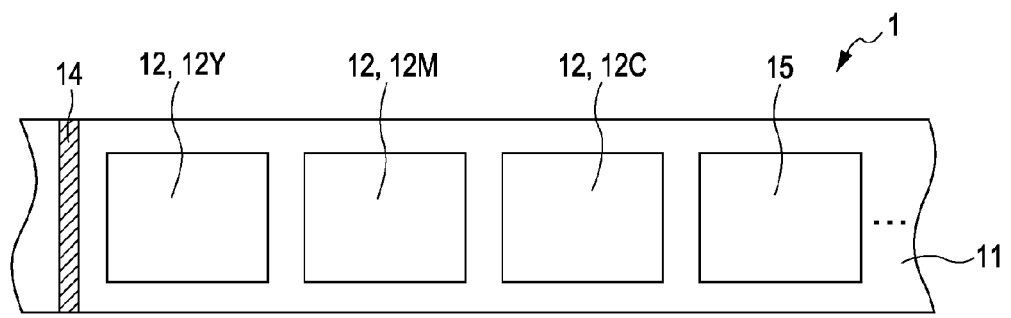
FIG. 4 is a schematic plan view showing an example of a thermal transfer sheet provided with a transfer protective layer.

Moreover, as indicated by the schematic plan view showing an example of a thermal transfer sheet shown in FIG. 4, in the above-described thermal transfer sheet 1, repetition of thermal transfer dye layers 12 (for example, 12Y, 12M, and 12C) may be disposed on the base material sheet 11, and furthermore, a transparent transfer protective layer 15 may be disposed, which is transferred to a print image surface after image printing so as to protect the print image surface. In addition, a detection mark 14 may be disposed as shown in FIG. 2 described above.

Figure 5:
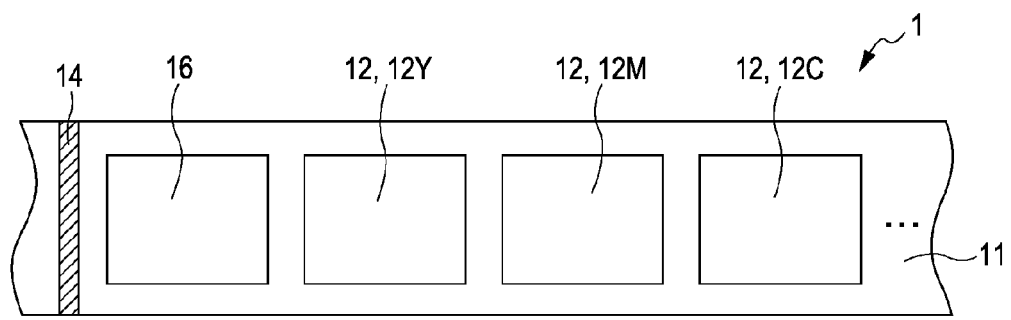
FIG. 5 is a schematic plan view showing an example of a thermal transfer sheet provided with a transfer pattern receiving layer.

Alternatively, as indicated by the schematic plan view showing an example of a thermal transfer sheet shown in FIG. 5, in the above-described thermal transfer sheet 1, a transfer pattern receiving layer 16 to be transferred to the normal paper may be disposed between the thermal transfer dye layer 12 and the detection mark 14. Transfer pattern receiving layer is formed on the normal paper surface prior to transfer of the thermal transfer dye layers 12 because of this transfer pattern receiving layer 16. It is preferable that the above-described detection mark 14 is disposed, and the detection marks 14 may be disposed between the thermal transfer dye layers 12, as shown in FIG. 3 described above.

The above-described thermal transfer dye layers 12 are formed from at least dyes of individual colors and a binder. As for the binders, for example, organic solvents and water-soluble resins, e.g., water-soluble resins of cellulose base, acrylic acid base, starch base, and the like, acrylic resins, polyphenylene oxide, polysulfone, polyether sulfone, and acetyl cellulose are used. From the viewpoint of the recording sensitivity and the preservation stability of a transfer member, binders having heat distortion temperatures of 70° C. to 150° C. are excellent.

Therefore, preferable examples of the above-described thermal transfer dye layers 12 include polystyrenes, polyvinylbutyrals, polycarbonates, methacrylic resins, acrylonitrile-styrene copolymers, polyester resins, urethane resins, chlorinated polyethylenes, and chlorinated polypropylenes.

As for the above-described dyes, any dye can be used. For example, as for the yellow dye, azo dyes, disazo dyes, methine dyes, pyridone-azo dyes, and the like and mixtures thereof are used. As for the magenta dye, azo dyes, anthraquinone dyes, styryl dyes, heterocyclic azo dyes, and mixtures thereof are used. As for the cyan dyes, indoaniline dyes, anthraquinone dyes, naphthoquinone dyes, heterocyclic azo dyes, and mixtures thereof are used. On the other hand, the surface on the opposite side of the above-described thermal transfer dye layer 12 runs while being in contact with the thermal head and, therefore, is provided with the heat-resistant lubricating layer 13.

This heat-resistant lubricating layer 13 is primarily contains a binder and, as necessary, contains a lubricant to adjust the slip property, and a filler to give the slip property and the thermal head polishing property.

As for the binder, a binder prepared by mixing any one of the polyvinyl acetal and the cellulose acetate propionate or a mixture thereof and the polyamide imide silicone is used.

As for the polyvinyl acetal, for example, a polyvinyl acetal having a softening point of 262° C. or higher is used. If the softening point of the polyvinyl acetal is lower than 262° C., it becomes difficult to obtain a low friction coefficient at high temperatures. In order to achieve low friction, a polyvinyl acetal having a softening point of 262° C. or higher is used preferably. Furthermore, it is preferable that the glass transition temperature Tg of the polyvinyl acetal is 106° C. or higher. If the glass transition temperature Tg is lower than 106° C. and is, for example, 90° C., in the case where preservation is conducted in a high-temperature high-humidity environment while being in contact with the dye layer, bonding to the dye layer occurs easily, and dye transfer occurs easily.

The degree of acetalization of the polyvinyl acetal is not specifically limited. However, it is preferable that an acetaldehyde raw material is used and the degree of acetalization is specified to be 80 percent by mass or more to have a glass transition temperature Tg of 106° C. or higher.

Moreover, the cellulose acetate propionate is also used as the binder preferably. The cellulose acetate propionate is not specifically limited.

The above-described two types of binders may be mixed with the polyamide imide silicone, alone or in a mixed state.

The mixing ratio in the case of use through mixing is not specifically limited. It is preferable that the cellulose acetate propionate is 20 parts by mass or less relative to 100 parts by mass of polyvinyl acetal or the polyvinyl acetal is 20 parts by mass or less relative to 100 parts by mass of cellulose acetate propionate. If the mixing ratio exceeds the above-described range, the compatibility becomes insufficient and sufficient lubricity and film strength are not obtained.

In addition, it is preferable that the polyamide imide silicone has a glass transition temperature Tg of 200° C. or higher. Furthermore, it is preferable that it is soluble in alcohol solvent. Examples of the above-described alcohol solvents include alcohols, e.g., toluene and ethanol. As for multifunctional silicone compounds subjected to copolymerization or modification, a silicone compound having any one of an hydroxyl group, a carboxyl group, an epoxy group, an amino group, an acid anhydride group, and an unsaturated group is used preferably. If the glass transition temperature Tg of the polyamide imide silicone resin is 200° C. or lower, the heat resistance in thermal transfer is insufficient. If the amount of copolymerized or modified silicone is too small, sufficient sliding performance is not obtained.

Furthermore, it is preferable that the mixing ratio of the at least one of the polyvinyl acetal and the cellulose acetate propionate to the polyamide imide silicone is 1:4 to 4:1. If the proportion of the at least one of the polyvinyl acetal and the cellulose acetate propionate is too small, the film strength, the flexibility, and the adhesion are insufficient. Conversely, if the proportion is too large, sufficient friction coefficient is not obtained.

Moreover, various lubricants may be mixed into the heat-resistant lubricating layer 13. However, polyvalent metal salts of alkyl fatty acids are preferable. As for the preferable amount of the polyvalent metal salt of alkyl fatty acid, it is preferable that the content in the heat-resistant lubricating layer 13 is 20.0 percent by mass or less, and the content is adjusted appropriately in accordance with the friction of the binder.

If the content in the heat-resistant lubricating layer 13 exceeds 20.0 percent by mass, poor dispersion occurs easily, and variations in friction between lots occur easily.

A filler may be added to the heat-resistant lubricating layer 13 appropriately. As for usable spherical fillers, inorganic fillers formed from silica, titanium oxide, zinc oxide, carbon and the like and organic fillers formed from silicone resins, fluororesins, benzoguanamine resins, and the like are used. Among the above-described materials, silicone resins are most preferable. As for the average particle diameter of the silicone resin, 0.5 μm to 5.0 μm is employed preferably. If the particle diameter is too small, protrusion from the heat-resistant lubricating layer becomes difficult, so that the slip property is not given easily. On the other hand, if the particle diameter is too large, transfer of the heat of the thermal head in image printing becomes difficult. In addition, in the case where unevenness is formed by using the silicone resin having a particle diameter within the above-described range, the contact surface between the thermal transfer dye layers 12 and the heat-resistant lubricating layer 13 is reduced when rolling and preservation are conducted, so that dye transfer is prevented and good sliding is facilitated. In this regard, the average particle diameter refers to an average particle diameter on the basis of measurement with a particle size distribution analyzer.

However, if the amount of addition of them is too large, poor drying occurs in film formation of the heat-resistant lubricating layer 13 and blocking occurs easily in the state of being rolled. Therefore, the amount of addition is adjusted appropriately.

The heat-resistant lubricating layer 13 may include tabular particles together with the above-described spherical silicone resin.

As for the tabular particles, inorganic fillers, e.g., talc, clay, and mica, and organic fillers formed from polyethylene resins and the like are used. Among the above-described materials, talc is most preferable from the viewpoint of the hardness. It is preferable that the average particle diameter of talc is larger than the average particle diameter of the spherical particles because if the average particle diameter is too small, the specific surface area increases and the frictional resistance is high in the case of contact with the thermal head. Preferably, 1.0 μm or more, and 10.0 μm or less is employed as the average particle diameter. If the average particle diameter exceeds 10 μm, dispersion of the talc into a paint becomes difficult and settlement may occur. On the other hand, if the average particle diameter is too large, the specific surface area decreases and a sufficient cleaning effect is not obtained. In this regard, the average particle diameter here refers to an average particle diameter (D50) on the basis of measurement by a laser diffraction method.

However, if the amount of addition of them is too large, settlement occurs easily in the paint and, thereby, painting becomes difficult and the friction increases. Therefore, the amount of addition is adjusted appropriately.

As for the filler in the heat-resistant lubricating layer 13, 0.45 percent by mass or less is preferable. In this regard, 4.76% of filler may be contained in the heat-resistant lubricating layer 13, as in Example 16 described later, depending on the condition.

EXAMPLES

Specific examples according to embodiments of the present invention will be described below in detail with reference to experimental results.

Polyvinyl Acetal

Compound 1

(Trade name KS-5, produced by Sekisui Chemical Co., Ltd., glass transition temperature (hereafter the glass transition temperature is referred to as Tg)=110° C., softening point 322° C.)

Compound 2

(Trade name KS-3, produced by Sekisui Chemical Co., Ltd., Tg=110° C., softening point 293° C.)

Compound 3

(Trade name KS-10, produced by Sekisui Chemical Co., Ltd., Tg=106° C., softening point 171° C.)

Compound 4

(Trade name BX-1, produced by Sekisui Chemical Co., Ltd., Tg=90° C., softening point 262° C.)

Cellulose Acetate Propionate

Compound 5

(Trade name CAP482-20, produced by Eastman Chemical Company, Tg=147° C.)

Compound 6

(Trade name CAP482-0.5, produced by Eastman Chemical Company, Tg=142° C.)

Compound 7

(Trade name CAP504-0.2, produced by Eastman Chemical Company, Tg=159° C.)

Cellulose Acetate Butyrate

Compound 8

(Trade name CAB531-1, produced by Eastman Chemical Company, Tg=115° C.)

Compound 9

(Trade name CAB381-20, produced by Eastman Chemical Company, Tg=141° C.)

Polyamide Imide Silicone

Compound 10

(Trade name HR14ET (25% solution, ethanol:toluene=1:1), produced by Toyobo Co., Ltd., Tg=250° C.)

Lubricant

Zinc Stearate (Trade name GF-200, produced by NOF CORPORATION) Filler

Polymethylsilsesquioxane (Trade name XC-99, produced by Toshiba Silicone Co., Ltd., average particle diameter 0.7 µm)

Talc (Trade name SG-95, produced by NIPPON TALC Co., Ltd., average particle diameter 2.5 µm)

The above-described compounds were used, and thermal transfer sheets were produced by the following technique.

Initially, a polyester film (trade name Lumirror, produced by Toray Industries, Ltd.) having a thickness of 6 µm was used as a base material sheet, and one surface thereof was coated with ink compositions, as described below, in such a way that the thickness became 1 µm after drying, followed by drying.

| Yellow ink | |
| --- | --- |
| Foron Yellow (produced by Sandoz K.K.) | 5.0 parts by weight |
| Polyvinyl butyral resin (trade name BX-1, produced by Sekisui Chemical Co., Ltd.) | 5.0 parts by weight |
| Methyl ethyl ketone | 45.0 parts by weight |
| Toluene | 45.0 parts by weight |
| Magenta ink | |
| Foron red | 2.5 parts by weight |
| Anthraquinone dye (trade name ESC451, produced by Sumitomo Chemical Co., Ltd.) | 2.5 parts by weight |
| Polyvinyl butyral resin (trade name BX-1, produced by Sekisui Chemical Co., Ltd.) | 5.0 parts by weight |
| Methyl ethyl ketone | 45.0 parts by weight |
| Toluene | 45.0 parts by weight |
| Cyan ink | |
| Foron Blue (produced by Sandoz K.K.) | 2.5 parts by weight |
| Indoaniline dye (structural formula is shown as Chemical formula 1 described below) | 2.5 parts by weight |
| Polyvinyl butyral resin (trade name BX-1, produced by Sekisui Chemical Co., Ltd.) | 5.0 parts by weight |
| Methyl ethyl ketone | 45.0 parts by weight |
| Toluene | 45.0 parts by weight |

[Chemical formula 1]

$$\text{H}_3\text{COCHN} - \text{C}_6\text{H}_2(\text{Cl})(\text{CH}_3)(=O) = N - \text{C}_6\text{H}_3(\text{CH}_3) - N(\text{CH}_3)_2$$

Next, a surface of the base material sheet opposite to the surface coated with the thermal transfer dye layers was coated with a heat-resistant lubricating layer having the following composition in such a way that the thickness became 0.5 µm after drying and, thereby, thermal transfer sheets of Example 1 to Example 16 were obtained.

Example 1 to Example 16

Heat-Resistant Lubricating Layer Composition

The amounts of addition of the binder, the lubricant, and the filler are shown in Table 1 described below.

Furthermore, as for the organic solvent, 1,900 parts of mixed solvent (ethanol:toluene:n-butanol:xylene=8:8:1:1) was used.

In this regard, a percent by mass in Table 1 indicates the proportion of the mass contained in a layer after formation.

TABLE 1

| | Binder | Parts by weight of addition of binder | Binder ratio | Lubricant | Parts by weight of lubricant (percent by mass in layer) | Filler | Parts by weight of filler (percent by mass in layer) |
| --- | --- | --- | --- | --- | --- | --- | --- |
| Example 1 | Compound 1 | 100 | 1 | GF200 | 20 | XC-99 | 1 (0.45) |
| | Compound 10 | 400 | 1 | | (9.0) | | |

TABLE 1-continued

| | Binder | Parts by weight of addition of binder | Binder ratio | Lubricant | Parts by weight of lubricant (percent by mass in layer) | Filler | Parts by weight of filler (percent by mass in layer) |
|---|---|---|---|---|---|---|---|
| Example 2 | Compound 1 | 60 | 1 | GF200 | 20 | XC-99 | 1 (0.45) |
| | Compound 10 | 560 | 2.3 | | (9.0) | | |
| Example 3 | Compound 1 | 40 | 1 | GF200 | 20 | XC-99 | 1 (0.45) |
| | Compound 10 | 640 | 4 | | (9.0) | | |
| Example 4 | Compound 1 | 140 | 2.3 | GF200 | 20 | XC-99 | 1 (0.45) |
| | Compound 10 | 240 | 1 | | (9.0) | | |
| Example 5 | Compound 1 | 160 | 4 | GF200 | 20 | XC-99 | 1 (0.45) |
| | Compound 10 | 160 | 1 | | (9.0) | | |
| Example 6 | Compound 2 | 100 | 1 | GF200 | 20 | XC-99 | 1 (0.45) |
| | Compound 10 | 400 | 1 | | (9.0) | SG-95 | 1 (0.45) |
| Example 7 | Compound 5 | 100 | 1 | GF200 | 20 | XC-99 | 1 (0.45) |
| | Compound 10 | 400 | 1 | | (9.0) | SG-95 | 1 (0.45) |
| Example 8 | Compound 5 | 60 | 1 | GF200 | 20 | XC-99 | 1 (0.45) |
| | Compound 10 | 560 | 2.3 | | (9.0) | SG-95 | 1 (0.45) |
| Example 9 | Compound 5 | 40 | 1 | GF200 | 20 | XC-99 | 1 (0.45) |
| | Compound 10 | 640 | 4 | | (9.0) | | |
| Example 10 | Compound 5 | 140 | 2.3 | GF200 | 20 | XC-99 | 1 (0.45) |
| | Compound 10 | 240 | 1 | | (9.0) | SG-95 | 1 (0.45) |
| Example 11 | Compound 5 | 160 | 4 | GF200 | 20 | XC-99 | 1 (0.45) |
| | Compound 10 | 160 | 1 | | (9.0) | | |
| Example 12 | Compound 6 | 100 | 1 | GF200 | 20 | XC-99 | 1 (0.45) |
| | Compound 10 | 400 | 1 | | (9.0) | SG-95 | 1 (0.45) |
| Example 13 | Compound 7 | 100 | 1 | GF200 | 20 | XC-99 | 1 (0.45) |
| | Compound 10 | 400 | 1 | | (9.0) | SG-95 | 1 (0.45) |
| Example 14 | Compound 1 | 10 | 0.1 | GF200 | 20 | XC-99 | 1 (0.45) |
| | Compound 5 | 90 | 0.9 | | (9.0) | SG-95 | 1 (0.45) |
| | Compound 10 | 400 | 1 | | | | |
| Example 15 | Compound 1 | 100 | 1 | GF200 | 50 | XC-99 | 1 (0.39) |
| | Compound 10 | 400 | 1 | | (20) | | |
| Example 16 | Compound 1 | 100 | 1 | GF200 | 20 | XC-99 | 11 (4.76) |
| | Compound 10 | 400 | 1 | | (8.6) | | |

TABLE 2

| | Binder | Parts by weight of addition of binder | Binder ratio | Lubricant | Parts by weight of lubricant (percent by mass in layer) | Filler | Parts by weight of filler (percent by mass in layer) |
|---|---|---|---|---|---|---|---|
| Comparative example 1 | Compound 1 | 170 | 5.4 | GF200 | 20 | XC-99 | 1 (0.45) |
| | Compound 10 | 120 | 1 | | (9.0) | SG-95 | 1 (0.45) |
| Comparative example 2 | Compound 1 | 30 | 1 | GF200 | 20 | XC-99 | 1 (0.45) |
| | Compound 10 | 680 | 5.4 | | (9.0) | SG-95 | 1 (0.45) |
| Comparative example 3 | Compound 3 | 100 | 1 | GF200 | 20 | XC-99 | 1 (0.45) |
| | Compound 10 | 400 | 1 | | (9.0) | SG-95 | 1 (0.45) |
| Comparative example 4 | Compound 4 | 100 | 1 | GF200 | 20 | XC-99 | 1 (0.45) |
| | Compound 10 | 400 | 1 | | (9.0) | SG-95 | 1 (0.45) |
| Comparative example 5 | Compound 5 | 170 | 5.4 | GF200 | 20 | XC-99 | 1 (0.45) |
| | Compound 10 | 120 | 1 | | (9.0) | SG-95 | 1 (0.45) |
| Comparative example 6 | Compound 5 | 30 | 1 | GF200 | 20 | XC-99 | 1 (0.45) |
| | Compound 10 | 680 | 5.4 | | (9.0) | SG-95 | 1 (0.45) |
| Comparative example 7 | Compound 8 | 100 | 1 | GF200 | 20 | XC-99 | 1 (0.45) |
| | Compound 10 | 400 | 1 | | (9.0) | SG-95 | 1 (0.45) |
| Comparative example 8 | Compound 9 | 100 | 1 | GF200 | 20 | XC-99 | 1 (0.45) |
| | Compound 10 | 400 | 1 | | (9.0) | SG-95 | 1 (0.45) |
| Comparative example 9 | Compound 1 | 100 | 1 | GF200 | 20 | XC-99 | 7 (2.29) |
| | Compound 10 | 400 | 1 | | (8.54) | SG-95 | 7 (2.29) |
| Comparative example 10 | Compound 1 | 100 | 1 | GF200 | 60 | XC-99 | 1 (0.38) |
| | Compound 10 | 400 | 1 | | (22.9) | SG-95 | 1 (0.38) |

Comparative Example 1 to Comparative Example 10

A surface of the base material sheet opposite to the surface coated with the thermal transfer dye layers was coated with a heat-resistant lubricating layer having the following composition in such a way that the thickness became 0.5 μm after drying in a manner similar to that in Example 1 to Example 16 shown in Table 1 described above and, thereby, thermal transfer sheets were obtained.

Composition of Heat-Resistant Lubricating Layer

The amounts of addition of the binder, the lubricant, and the filler are shown in Table 2 described above.

Furthermore, as for the organic solvent, 1,900 parts of mixed solvent (ethanol:toluene:n-butanol:xylene=8:8:1:1) was used.

In this regard, a percent by mass in Table 2 indicates the proportion of the mass contained in a layer after formation.

Figure 6:
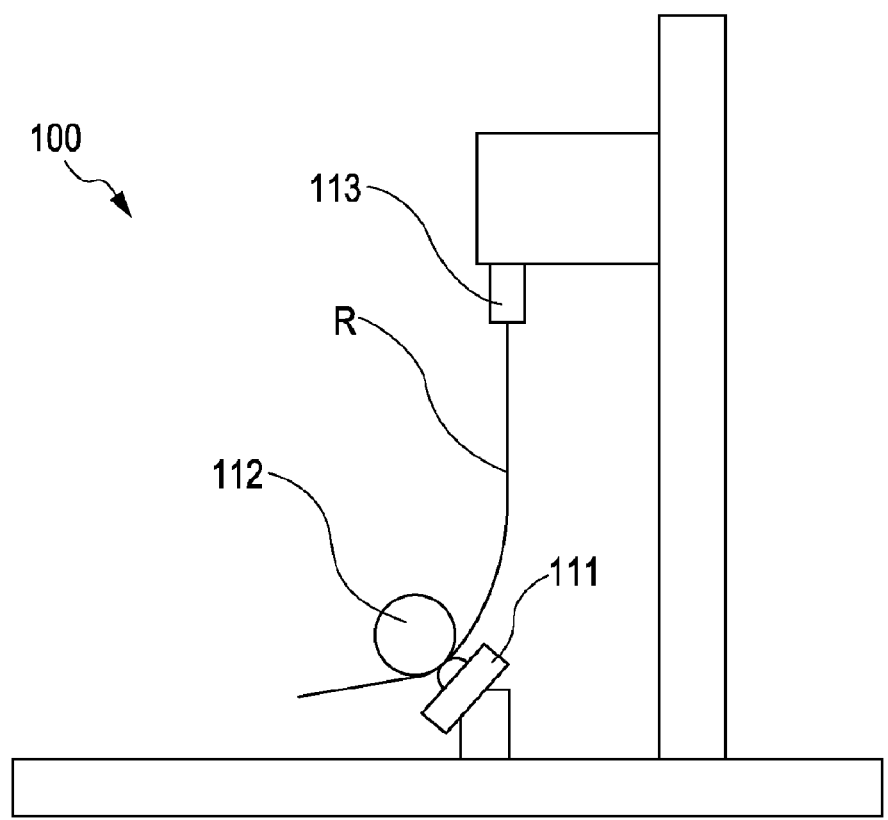
FIG. 6 is a schematic diagram showing the rough configuration of a friction measuring apparatus.

Regarding these thermal transfer sheets formed in Examples and Comparative examples, the friction coefficient, the running smoothness, the sticking, the dye preservation performance, and the thermal head staining resistance were measured. The friction coefficient was measured by using a friction measuring apparatus 100 shown in FIG. 6. Regarding this friction measuring apparatus 100, a thermal transfer sheet 1 and photographic paper R are sandwiched between a thermal head 111 and a platen roll 112, the thermal transfer sheet 1 and the photographic paper R are pulled up with a tension gauge 113 and, thereby, a tension is measured. The measurement condition is as described below.

Measurement Condition
Thermal transfer sheet feed speed: 450 mm/min
Signal Setting
Print pattern: 2 (Stair Step)
Original: 3 ($^{48}/_{672}$ lines, 14 steps)
Strobe division: 1
Strobe pulse width: 20.0 msec
Printing speed: 22.0 msec/1 line
Clock: 3 (4 MHz)
Head voltage: 18.0 V Furthermore, the running smoothness, the sticking, and the thermal head staining resistance were evaluated by using the following methods. The resulting thermal transfer sheet was mounted on a full color printer (trade name UP-D7000) produced by Sony Corporation, and gray-scale image printing (with a 16-step gradation) was conducted on photographic paper (trade name UPC7010 produced by Sony Corporation). The running smoothness (variations in image printing, wrinkle generation, and deviation in image printing) and the sticking were checked visually with respect to the results of image printing.

Regarding the running smoothness, a symbol ◉ indicates that the result was good, and a symbol × indicates that wrinkles and the like were generated. Regarding the sticking, the symbol ◉ indicates that no sticking occurred, and the symbol × indicates that sticking occurred.

Regarding the thermal head staining resistance, gray-scale image printing was repeated 20,000 times and, thereafter, the thermal head surface was observed with an optical microscope. The symbol ◉ indicates that the result was good, and the symbol × indicates that adhered materials were observed and, therefore, staining occurred.

Moreover, regarding the dye preservation performance, the resulting two thermal transfer sheets (20 cm×20 cm) were stacked in such a way that the thermal transfer dye layers of one sheet faced the heat-resistant lubricating layer of the other sheet. The two sheets were sandwiched between two glass plates, a load was applied from above with a 5-kg weight, and preservation was conducted in an oven at 50° C. for 48 hours. The thermal transfer sheets before and after the preservation were mounted on the full color printer (trade name UP-D7000) produced by Sony Corporation, and gray-scale image printing (with a 16-step gradation) was conducted on photographic paper (trade name UPC7010 produced by Sony Corporation). Regarding the results of image printing, a maximum density of each color was measured by a reflection density measurement with Macbeth densitometer (trade name TR-924). The dye preservation performance was evaluated on the basis of a calculation result of maximum density after preservation/maximum density before preservation× 100(%). The results are shown in Table 3.

TABLE 3

| | Friction coefficient (min) | Friction coefficient (max) | Running smoothness | Sticking | Dye preservation performance | Thermal head staining resistance |
|---|---|---|---|---|---|---|
| Example 1 | 0.17 | 0.19 | ◉ | ◉ | 99 | ◉ |
| Example 2 | 0.15 | 0.19 | ◉ | ◉ | 97 | ◉ |
| Example 3 | 0.14 | 0.17 | ◉ | ◉ | 96 | ◉ |
| Example 4 | 0.20 | 0.26 | ◉ | ◉ | 93 | ◉ |
| Example 5 | 0.22 | 0.27 | ◉ | ◉ | 92 | ◉ |
| Example 6 | 0.16 | 0.18 | ◉ | ◉ | 98 | ◉ |
| Example 7 | 0.17 | 0.23 | ◉ | ◉ | 99 | ◉ |
| Example 8 | 0.15 | 0.18 | ◉ | ◉ | 97 | ◉ |
| Example 9 | 0.13 | 0.17 | ◉ | ◉ | 99 | ◉ |
| Example 10 | 0.20 | 0.25 | ◉ | ◉ | 98 | ◉ |
| Example 11 | 0.21 | 0.27 | ◉ | ◉ | 98 | ◉ |
| Example 12 | 0.15 | 0.18 | ◉ | ◉ | 99 | ◉ |
| Example 13 | 0.16 | 0.19 | ◉ | ◉ | 99 | ◉ |
| Example 14 | 0.17 | 0.19 | ◉ | ◉ | 99 | ◉ |
| Example 15 | 0.21 | 0.27 | ◉ | ◉ | 96 | ◉ |
| Example 16 | 0.19 | 0.25 | ◉ | ◉ | 99 | ◉ |
| Comparative example 1 | 0.24 | 0.32 | × | × | 88 | ◉ |
| Comparative example 2 | 0.14 | 0.16 | ◉ | ◉ | 99 | × |
| Comparative example 3 | 0.15 | 0.30 | × | × | 97 | ◉ |
| Comparative example 4 | 0.20 | 0.23 | ◉ | ◉ | 88 | ◉ |
| Comparative example 5 | 0.23 | 0.30 | × | × | 90 | ◉ |
| Comparative example 6 | 0.14 | 0.15 | ◉ | ◉ | 99 | × |
| Comparative example 7 | 0.16 | 0.26 | ◉ | ◉ | 85 | ◉ |

TABLE 3-continued

|  | Friction coefficient (min) | Friction coefficient (max) | Running smoothness | Sticking | Dye preservation performance | Thermal head staining resistance |
|---|---|---|---|---|---|---|
| Comparative example 8 | 0.18 | 0.25 | ⊙ | ⊙ | 85 | ⊙ |
| Comparative example 9 | 0.25 | 0.30 | x | x | 90 | ⊙ |
| Comparative example 10 | 0.25 | 0.31 | x | x | 95 | ⊙ |

As is clear from the results shown in Table 3, regarding all of Example 1 to Example 16, the running smoothness was good, the friction was low, sticking was not observed, and sharp images were obtained. Furthermore, regarding Example 1 to Example 16, the dye preservation performance of 90% or more was achieved and, therefore, there was substantially no problem in practical use. Moreover, as a result of observation of the thermal heads in Example 1 to Example 16, substantially no staining of thermal head surface occurred, there was substantially no trace of shaving of the thermal head surface, repetition of image printing was substantially not affected and, therefore, good images were obtained.

On the other hand, regarding Comparative example 1, the friction increased and satisfactory running smoothness was not obtained. In addition, sticking because of the increase in friction was observed. Furthermore, bonding to the dye layer occurred and the dye preservation performance was reduced.

In Comparative example 2, the friction was low, both the running smoothness and the sticking exhibited good results, and the dye preservation performance was good. However, it was ascertained that if image printing was repeated, powder falling from the heat-resistant lubricating layer occurred so as to cause an occurrence of flaws in image printing.

In Comparative example 3, the friction increased and satisfactory running smoothness was not obtained. In addition, sticking because of the increase in friction was observed.

In Comparative example 4, bonding to the dye layer occurred and the dye preservation performance was reduced.

In Comparative example 5, the friction increased and satisfactory running smoothness was not obtained. In addition, sticking because of the increase in friction was observed.

In Comparative example 6, the friction was low, both the running smoothness and the sticking exhibited good results, and the dye preservation performance was good. However, as in Comparative example 2, it was ascertained that if image printing was repeated, powder falling from the heat-resistant lubricating layer occurred so as to cause an occurrence of flaws in image printing.

In Comparative examples 7 and 8, the friction, the running smoothness, and the sticking all exhibited good results. However, the dye preservation performance was reduced as a result.

In Comparative example 9, the friction increased and satisfactory running smoothness was not obtained. In addition, sticking because of the increase in friction was observed.

In Comparative example 10 as well, the friction increased and satisfactory running smoothness was not obtained. In addition, sticking because of the increase in friction was observed.

As described above, the friction coefficient between the thermal head and the thermal transfer sheet was reduced by using the thermal transfer sheet 1 according to an embodiment of the present invention. Consequently, good running smoothness was exhibited and sticking was prevented. Furthermore, regarding the thermal transfer sheet 1 according to an embodiment of the present invention, good dye preservation performance is exhibited, the staining of the thermal head is prevented and, therefore, a good image can is obtained.

Next, a key image printing portion of an example of an image printing apparatus to print on a substrate by using the thermal transfer sheet 1 according to an embodiment of the present invention will be described with reference to a schematic configuration diagram shown in FIG. 7.

As shown in FIG. 7, the key image printing portion of the image printing apparatus is provided with a feed reel 51 to feed a thermal transfer sheet 1 and a take-up reel 52 to take up the above-described thermal transfer sheet 1. In addition, guide rollers 53 and 54 to guide the above-described thermal transfer sheet 1 to an image printing position are disposed. A thermal transfer head 31 to form the image printing position is disposed between the above-described guide rollers 53 and 54.

Moreover, a platen 55 to rotate and convey an image receiving sheet (hereafter referred to as photographic paper) R to the image printing position corresponding to the above-described thermal transfer head 31 is disposed.

An example of details of the key image printing portion having the above-described configuration will be described below.

The thermal transfer sheet 1 rolled on the above-described feed reel 51 is taken up with the take-up reel 52 driven to rotate by a drive motor (not shown in the drawing) while being supported with the guide rollers 53 and 54.

The above-described feed reel 51 is provided with, for example, a torque limiter, although not shown in the drawing, so as to apply a back tension to the thermal transfer sheet 1 with a constant torque.

Furthermore, the above-described take-up reel 52 is provided with, for example, a take-up detection encoder formed from an optical sensor, although not shown in the drawing.

The above-described thermal transfer sheet 1 is coated with, for example, color dyes of yellow, magenta, and cyan having respective predetermined lengths as dyes for one page.

Furthermore, the above-described thermal transfer sheet 1 is coated with a page forefront mark and a roll diameter mark serving as detection marks at the forefront position of the color dyes for each page and, in addition, the thermal transfer sheet 1 is coated with a color discrimination mark to discriminate individual colors at the forefront position of each color dye.

Consequently, in the image printing apparatus, an optical sensor 32 disposed on a running path of the thermal transfer sheet 1 detects the individual page forefront marks and the color discrimination marks and conduct positioning of the forefront portion of each dye of the thermal transfer sheet 1 on the basis of the detection results.

Although not shown in the drawing, a head unit provided with the above-described thermal transfer head 31 is removably attached to one end of a pressure lever rotatably held by a rotating shift. The other end of the pressure lever is attached to a cam plate through a link in such a way that shaking is possible. Consequently, the head unit is moved upward and downward by the above-described cam plate being driven to rotate by a head drive motor and is positioned at an intermediate position, from which movement is possible in a vertical direction, an initial position, at which the head unit leaves a ribbon because of upward movement from the intermediate position, and a lowest position, at which contact with the photographic paper R occurs because of downward movement from the intermediate position.

Consequently, the head unit moves to the initial position when, for example, the thermal transfer sheet 1 is mounted and moves to the lowest position when the photographic paper R is placed on the platen 55.

The state of upward and downward movement of the head unit is detected with, for example, an optical sensor disposed in the vicinity of a notch of the cam plate. The thermal transfer head 31 is formed to be an end surface type, and comes into contact with the photographic paper R throughout the width of the photographic paper R with the thermal transfer sheet 1 therebetween.

Accordingly, in the case where the photographic paper R is moved in a direction indicated by an arrow, a desired image is printed on all over the surface of the photographic paper R.

An image is printed on the photographic paper R by using the image printing apparatus including the above-described key image printing portion so as to obtain a printed material.

Next, a method for forming an image on photographic paper will be described.

As for the thermal transfer sheet 1 used in the image printing apparatus, for example, a yellow dye layer 12Y, a magenta dye layer 12M, a cyan dye layer 12C, and a transfer protective layer 15 are arranged repeatedly in that order from the take-up side (take-up reel 52) toward the feed side (feed reel 51), as shown in, for example, FIG. 4 described above.

The image printing apparatus including the key image printing portion explained with reference to FIG. 7 described above is used and, thereby, images of individual color components of yellow, magenta, and cyan are subjected to sublimation thermal transfer in that order to the side of an image receiving layer (image printing surface) disposed on the surface of the photographic paper. Thereafter, the transfer protective layer 15 having a predetermined pattern is subjected to sublimation thermal transfer all over the surface.

At that time, the above-described image printing apparatus (for example, color printer) transfers a laminate film (not shown in the drawing) all over the surface of the photographic paper regardless of the color of the image.

As described above, in this color printer, image formation on the basis of laminate information and other color information are conducted in the same image printing process.

In this connection, the transfer protective layer 15 is formed from components in such a way as to have a light-diffusing property and the transfer protective layer 15 is subjected to sublimation thermal transfer with a predetermined image printing pattern.

The present application contains subject matter related to that disclosed in Japanese Priority Patent Application JP 2009-153621 filed in the Japan Patent Office on Jun. 29, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A thermal transfer sheet comprising:
    a base material sheet;
    a thermal transfer dye layer, which is disposed on one surface of the base material sheet and which contains a dye; and
    a heat-resistant lubricating layer disposed on the other surface of the base material sheet,
    wherein the heat-resistant lubricating layer is formed from a binder, in which a specific amount of at least one of a polyvinyl acetal having a softening point of 262° C. or higher and a glass transition temperature of 106° C. or higher and a cellulose acetate propionate and a specific amount of polyamide imide silicone are mixed.

2. The thermal transfer sheet according to claim 1, wherein the mixing ratio of the at least one of a polyvinyl acetal and a cellulose acetate propionate to the polyamide imide silicone is 1:4 to 4:1.

3. The thermal transfer sheet according to claim 1, wherein 20.0 percent by mass or less of polyvalent metal salt of alkyl fatty acid is comprised relative to the binder in the heat-resistant lubricating layer.

4. The thermal transfer sheet according to claim 1, wherein a filler is comprised in the heat-resistant lubricating layer, and
    the filler is formed from spherical particles of polymethylsilsesquioxane or a mixture of spherical particles of polymethylsilsesquioxane and tabular particles of talc.

* * * * *